FIG. 3

JAMES D. BARGAINER, JR.
INVENTOR

JAMES D. BARGAINER, JR.
INVENTOR.

BY Arthur F Zobal

3,402,294
RADIATION MEASURING SYSTEM AND METHOD

James D. Bargainer, Jr., Austin, Tex., assignor to Mobil Oil Corporation, a corporation of New York
Filed Feb. 7, 1964, Ser. No. 343,315
8 Claims. (Cl. 250—71.5)

This invention relates to the measurement of decay, growth, and lifetime of radiation or of radioisotopes and more particularly to the automatic production of a function indicative of such quantities and has for an object a radioactive well logging method of any system for producing continuously and in correlation with depth a function representative of the decay or lifetime of secondary radiation or of radioisotopes formed by the irradiation of formations traversed by a borehole.

In radioactive analysis the quantities, the decay constant, the mean life, or the half life are measured to identify unknown elements. For example, in radioactive well logging a measurement of the mean life of thermal neutrons gives an indication of the salinity of the formations.

In accordance with the present invention, there is provided a radioactive well logging method of and system for automatically measuring quantities such as the decay constant or mean life. In the method of the present invention, the formations traversed by a borehole are irradiated with pulses of primary radiation spaced in time to define periodic operating cycles. Secondary radiation passing into the borehole is detected and measurements are made of secondary radiation detected within first and second recurring time periods both of which preferably occur within each cycle. The time relationship between the two time periods is varied in order to maintain a constant relationship between the two measurements to measure the decay constant or mean life. More particularly, as the rate of decay changes in different formations a desired ratio between the two measurements is maintained by varying the selection of secondary radiation detected thereby varying the time of occurrence of the second and later time period with respect to the first time period. A function which varies in a manner related to the variation of the difference between the time of occurrence of the first and second time periods is produced for obtaining a measurement indicative of the decay constant or mean life. This technique has advantages in that the counts detected within the second and later time period are maintained at a desirable level to obtain accurate measurements.

More particularly, due to statistical fluctuation of nuclear processes the number of counts detected during a given measurement will differ from a mean value as determined from a series of measurements. The amount of deviation is the statistical error. At low count rates, the percentage error increases over that occurring at high count rates, thereby resulting in less reliable data. In pulsed radiation analysis of radiation decay, as in continuous well logging, the total number of counts detected during a given time measurement later in time within the cycles of irradiation fluctuates extensively as the rate of decay changes in different formations. For example, when the rate of decay increases, the number of counts detected during the later time measurement may decrease to an extremely low level. If the low counts measured at this low level are employed to determine the decay constant, the accuracy of the measurements may be seriously affected for the reasons given above. In accordance with the present invention, increased accuracy is obtained in the analysis of radiation decay by varying the time of occurrence of the second and later time period, for example, by moving the second time period to a region of higher count rate when the rate of decay increases.

The radioactive well logging system disclosed for carrying out the method comprises a borehole unit containing a radioactive source for irradiating the formations with pulses of primary radiation spaced in time for the production of secondary radiation. A detector is provided for detecting secondary radiation passing from the formations into the borehole. In addition, means is provided for moving continuously the borehole unit including the source and the detector along the borehole. Analyzing means responsive to secondary radiation detected produces first and second functions representative of secondary radiation detected respectively within first and second time periods following each pulse of primary radiation. In addition, means is provided for maintaining constant a desired relationship between the first and second functions by varying the response of the analyzing means to secondary radiation detected to vary the time of occurrence of the second time period. A continuous function is recorded in correlation with depth and related to the difference between the time of occurrence of the first and second time periods to obtain a measure of the decay constant or mean life. In one embodiment, the source is a neutron source and the detector a thermal neutron detector employed to produce a function representative of the decay constant or mean life of thermal neutrons.

For further objects and advantages of the present invention and for a more complete understanding thereof, reference may now be had to the following detailed description taken in conjunction with the accompanying drawings wherein.

Figures 1, 2:
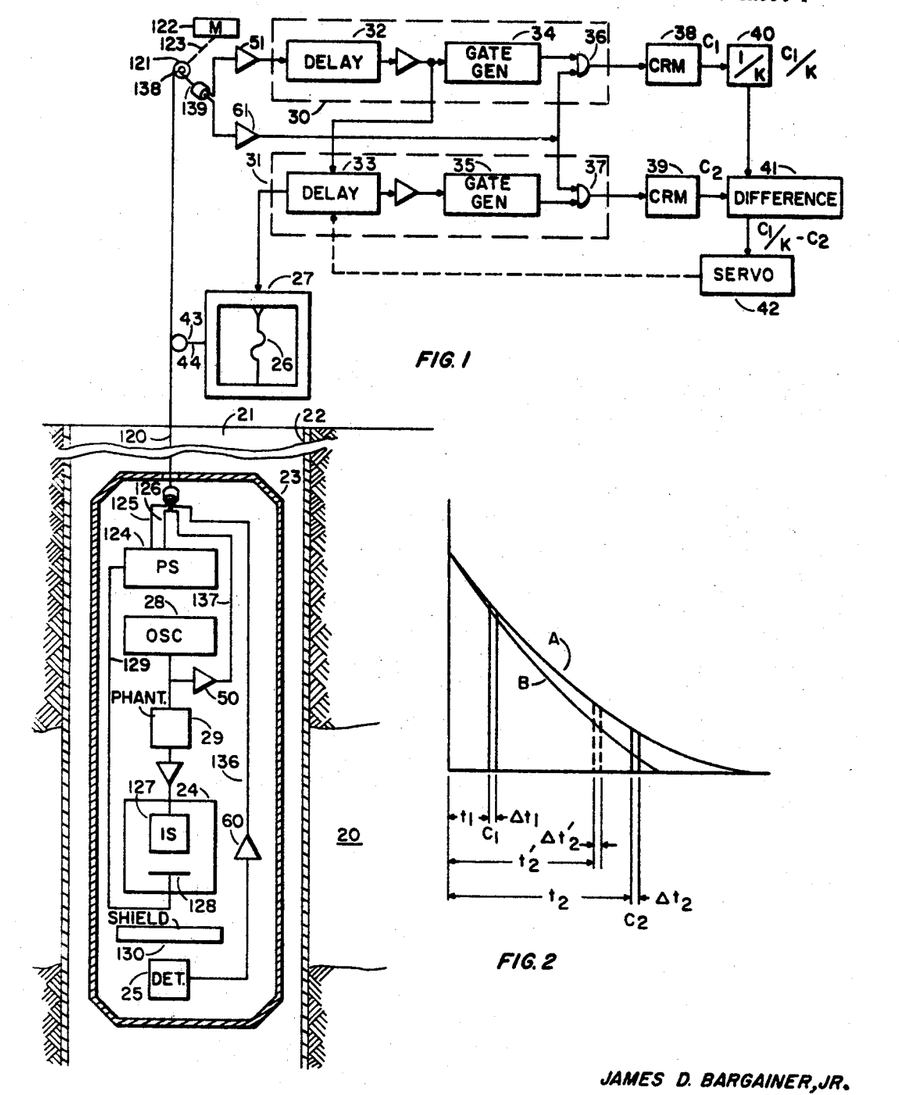
FIGURE 1 represets a system for investigating the elements in the formations traversed by a borehole.
FIGURE 2 represents decay curves useful in understanding the present invention.

Referring now to FIGURE 1 of the drawings, there will be described the method and system of the present invention for measuring directly the decay or lifetime of radiation or of radioisotopes in order to identify unknown elements. In this illustration, the elements of interest are those, for example, in formation 20 traversed by a borehole 21 lined with iron casing 22. In carrying out the method, the formations are irradiated with pulses or bursts of primary radiation spaced in time to define periodic cycles and secondary radiation produced is detected in the borehole. The system for carrying out these operations includes a logging instrument 23 containing a source 24 for irradiating the formations with pulses or bursts of primary radiation and a detector 25 for detecting secondary radiation passing from the formations into the borehole. The output of detector 25 is applied to the surface where measurements are obtained of secondary radiation detected within recurring first and second time periods. Preferably, measurements are made within first and second time periods both of which occur within each cycle; although, measurements may be made, for example, within first and second time periods, both of which occur within cycles other than successive cycles or which occur respectively within alternate cycles. From the two measurements obtained, a continuous trace 26 in correlation with depth is produced by recorder 27 and directly displays the decay constant or mean life of radiation or radioisotopes of interest.

In pulsed radiation measurements such as in logging operations, it is desirable to determine the rate of decay or decay constant of secondary radiation detected from at least two measurements made within two time periods within the irradiation cycles. This is due to the fact that the rate of decay or decay constant as obtained from two such measurements is independent of the fluctuation of the output of the source. In accordance with the present invention, the decay constant or mean life is obtained by varying at least one of the measurements in time, within the irradiation cycles, to maintain constant a desired relationship between the two measurements. In obtaining information about the decay or radiation detected, at least the later measurement in time is varied as the rate of decay changes.

More particularly, referring to FIGURE 2 of the drawings, the measurements obtained during the two time periods following each pulse of primary radiation may be expressed by the following equations:

$$C_1 = C_0 \tau \left(1 - e^{-\frac{\Delta t_1}{\tau}}\right) e^{-\frac{t_1}{\tau}} \quad (1)$$

and $$C_2 = C_0 \tau \left(1 - e^{-\frac{\Delta t_2}{\tau}}\right) e^{-\frac{t_2}{\tau}} \quad (2)$$

wherein:

$C_1$ and $C_2$ are the cumulated counts observed respectively within the two periods $\Delta t_1$ and $\Delta t_2$ over a plurality of cycles;

$C_0$ represents counting rate (counts per unit time) at a time zero for the same number of cycles;

$t_1$ and $t_2$ are the time intervals following time zero at which $\Delta t_1$ and $\Delta t_2$ begin; and $\tau$ is the mean life of the radiation detected or of the radioisotopes formed in the formations.

From the above expressions, the following relationship may be derived for the case where $\Delta t_1$ and $\Delta t_2$ are equal:

$$\tau = \frac{t_2 - t_1}{\ln \frac{C_1}{C_2}} = \frac{1}{\lambda} \quad (3)$$

wherein:

ln is the natural logarithm; and
$\lambda$ is the decay constant.

From Equation (3) it can be understood that if the ratio of $C_1$ to $C_2$ is maintained constant, the variation of the difference between $t_1$ and $t_2$ gives an indication of the variation of $\tau$ or $\lambda$. In accordance with the present invention, information is obtained about the decay of radiation detected by varying at least $t_2$ in order to maintain constant the ratio of $C_1$ to $C_2$. In the systems disclosed, $t_2$ is varied while $t_1$ and the ratio of $C_1$ to $C_2$ are held constant. In the preferred embodiment, a function is generated which varies in a manner related to the variation of the difference between $t_1$ and $t_2$ and from this function trace 26 is produced to measure the variation of $\tau$ or $\lambda$.

Advantages of measuring $\tau$ or $\lambda$ by varying $t_2$ can be seen by reference to FIGURE 2. Curve A represents the decay curve obtained opposite one type of formation, and curve B represents the decay curve obtained opposite another type of formation. More particularly, in pulsed radiation logging wherein the time between pulses of irradiation may be in the millisecond range, it is desirable to separate in time as far as possible the two measurement periods $\Delta t_1$ and $\Delta t_2$ in order to obtain a more accurate determination of the rate of decay. Yet, on the other hand, it can be seen that if $t_2$ or the time of occurrence of $\Delta t_2$ is maintained constant, the counts within $\Delta t_2$ greatly decrease as the tool, for example, passes from one formation to another formation. Less reliable results thus will be obtained if the greatly decreased counts within $\Delta t_2$ were employed to measure $\tau$ or $\lambda$. This is due to the increase in relative error at low count rates as mentioned above. Thus, when the rate of decay increases, more accurate measurements of $\tau$ or $\lambda$ can be obtained by decreasing $t_2$ and hence moving $\Delta t_2$ to a region of higher count rate illustrated at $t'_2$ and $\Delta t'_2$.

In one embodiment of the present invention, the trace 26 reflects the variation of the decay constant or mean life of thermal neutrons in the formations and is employed to differentiate between oil- and salt-water-bearing formations. More particularly, the formations are irradiated with pulses or bursts of fast neutrons for the production of thermal neutrons. The thermal neutrons diffuse in the formations until they are captured while others pass into the borehole and are detected. The rate of decay or capture of thermal neutrons as reflected by trace 26 is indicative of the thermal neutron-capture cross section of the elements present. The variation of the trace 26 thus gives an indication of the nature of the elements present in the formations. For example, if salt water instead of oil is present in the formations irradiated, the trace 26 will reflect an increase in the rate of capture or decay of thermal neutrons. This is due to the fact that chlorine in the salt water has a much larger capture cross section for thermal neutrons than do the constituents of oil.

Referring again to FIGURE 1, there will be described the system for continuously measuring $\tau$ or $\lambda$ by varying $t_2$. In the measurement of thermal neutrons, the source 24 employed is a pulsed neutron source and detector 25 is a thermal neutron detector. An oscillator 28 is employed in the borehole tool 23 to generate periodically trigger pulses at a certain repetition rate. These pulses trigger phantastron 29 for the production of electrical pulses of a desired duration to actuate the source 24 for the production of pulses of primary radiation. The trigger pulses from oscillator 28 also are applied to trigger the uphole instrumentation which comprises the systems illustrated by the dotted lines 30 and 31. Systems 30 and 31 select pulses from the detector 25 which are representative of the radiation detected respectively within time periods $\Delta t_1$ and $\Delta t_2$. More particularly, systems 30 and 31 comprise respectively delay circuits 32 and 33, gate generators 34 and 35, and positive "AND" gates 36 and 37. Periodically the trigger pulses from the borehole unit are applied to delay circuit 32 for the production of a trigger pulse at $t_1$. This pulse is applied to trigger gate generator 34 for the production of a pulse to open gate 36 for a time period equal $\Delta t_1$. The trigger pulse produced from delay circuit 32 also is applied to delay circuit 33 for the production of a trigger pulse at $t_2$. This pulse is applied to trigger gate generator 35 to open gate 37 during the time period $\Delta t_2$. During $\Delta t_1$ and $\Delta t_2$, pulses from the detector 25 are allowed to pass gates 36 and 37 to count rate meters 38 and 39 for the production of a set of functions representative of the intensity of radiation detected during $\Delta t_1$ and $\Delta t_2$ and hence representative of $C_1$ and $C_2$. If count rate meters 38 and 39 are of the type which require negative input pulses, the outputs of gates 36 and 37 may be inverted by means (not shown) prior to the application thereof to meters 38 and 39. The output of meter 38 is multiplied at 40 by the reciprocal of a constant of proportionally K desired to be maintained between $C_1$ and $C_2$. In one example, the constant of proportionality may be 2 wherein:

$$\frac{C_1}{C_2} = K = 2$$

A difference circuit 41 and a servo system 42 are provided to maintain the relationship constant. More particularly, the outputs of meter 39 and system 40 are applied to difference circuit 41 to establish the relationship:

$$\frac{C_1}{K} - C_2 = 0$$

If $$\frac{C_1}{K} - C_2$$

is not equal to zero, an error signal is produced by circuit 41 which actuates servo system 42 to vary the selection by system 31 of radiation detected and hence to increase or decrease $t_2$. For example, if $C_2$ becomes smaller than $C_1/K$, $t_2$ is decreased, thereby increasing $C_2$ until $$\frac{C_1}{K} - C_2 = 0$$

On the other hand, if $C_2$ becomes larger than $C_1/K$, $t_2$ is increased, thereby decreasing $C_2$. A function related to the variation of the difference between $t_1$ and $t_2$ is obtained from system 31 for the production of trace 26 representative of the variations of $\tau$ or $\lambda$. Measuring element 43 and mechanical connection 44 are employed to drive the chart of the recorder in correlation with depth.

Figure 3:
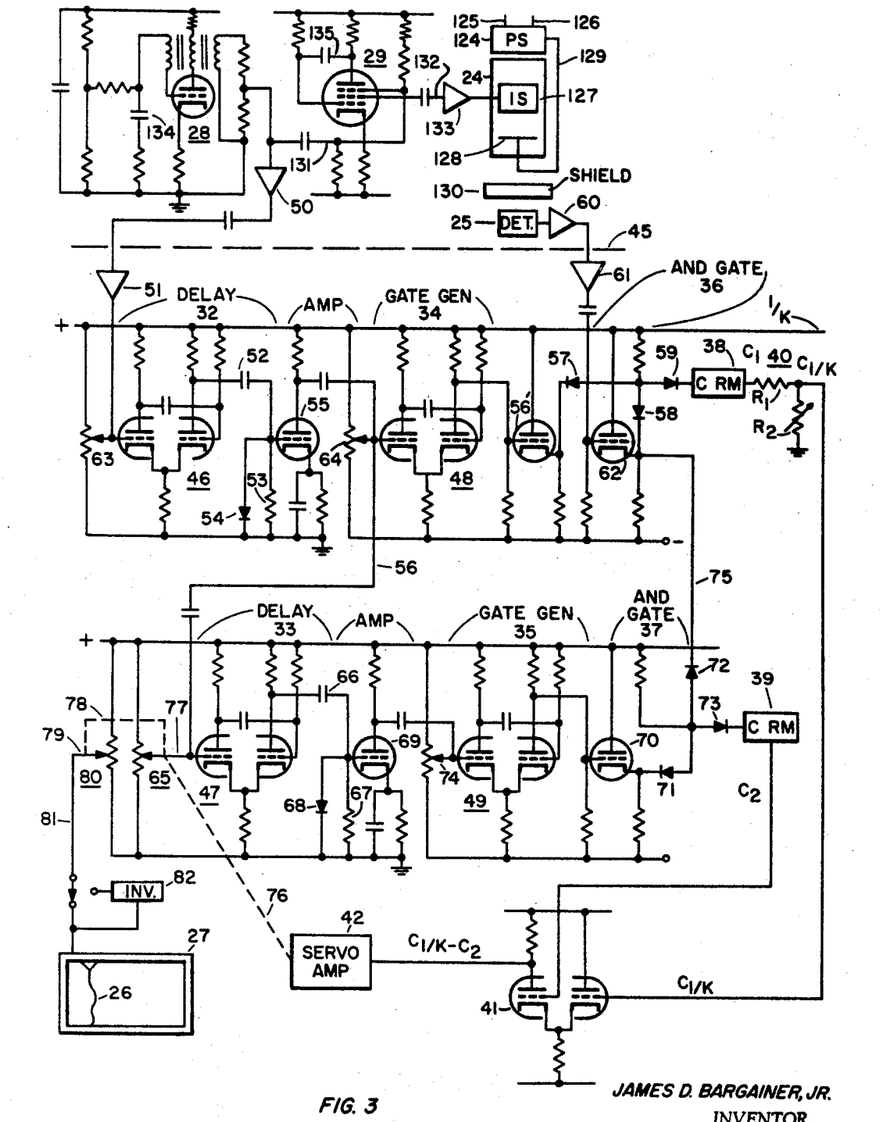
FIGURE 3 illustrates the circuitry employed by the system of FIGURE 1.

Referring now to FIGURE 3, there will be described in detail the circuitry of the system, the system above the dotted line 45 representing the borehole instrumentation and the system below the dotted line 45 representing the surface instrumentation. Delay circuits 32 and 33 respectively comprise cathode-coupled monostable multivibrators 46 and 47 coupled to differentiate and clip circuits. Gate generators 34 and 35 also comprise cathode-coupled monostable multivibrators 48 and 49. At the onset, the left stages of multivibrators 46–49 are off and the right stages are conducting. Under these conditions, positive pulses are produced at the plates of the right stages when the multivibrators are triggered. The width of the pulses produced by multivibrators 46 and 47 determine $t_1$ and $t_2$, the time of occurrence of $\Delta t_1$ and $\Delta t_2$. In addition, the width of the pulses produced by multivibrators 48 and 49 determines the width of $\Delta t_1$ and $\Delta t_2$. The time $t_1$ is maintained constant during logging; however, the time $t_2$ and hence the time occurrence of $\Delta t_2$ is varied by varying the voltage impressed on the grid of the left stage of multivibrator 47. This voltage is related to $t_2 - t_1$ and is employed to obtain a measure of $\tau$ or $\lambda$.

More particularly, trigger pulses from the oscillator 28 of the borehole unit are amplified at 50 and 51 for the production of positive pulses which are applied to the grid of the left stage of multivibrator 46. The positive pulse from the right stage of multivibrator 46 is differentiated at 52 and 53 with the leading positive peak being clipped at 54. The trailing negative peak is amplified and inverted at 55 for the production of a trigger pulse at $t_1$ which is applied to trigger multivibrator 48. This pulse also is applied by way of conductor 56 to trigger multivibrator 47 as will be described hereinafter. The positive pulse generated at the right stage of multivibrator 48 is applied by way of cathode follower 56' to open "AND" gate 36 which comprises diodes 57–59. The output from detector 25 is applied to "AND" gate 36 by way of amplifiers 60 and 61 and cathode follower 62. Prior to logging, $t_1$ and $\Delta t_1$ may be adjusted to desired values by adjusting resistors 63 and 64 of multivibrators 46 and 48.

The system 40 for multiplying the output of count rate meter 38 by $1/K$ comprises fixed resistor $R_1$ and variable resistor $R_2$. The transfer function of this circuit is $$\frac{R_2}{R_1 + R_2}$$

and the desired multiplication factor $1/K$, which may be $1/2$, is obtained by adjusting $R_2$. The output of system 40, which is equal to $C_1/K$, is then applied to difference circuit 41 which may be a difference amplifier, as illustrated.

As mentioned previously, multivibrator 47 is triggered by pulses applied from amplifier 55 and by way of conductor 56. The width of the pulse produced at the right stage of multivibrator 47 and hence $t_2 - t_1$ is varied during logging operations by varying potentiometer 65. More particularly, the output pulse from the right stage of multivibrator 47 is differentiated and clipped at 66–68. The resulting negative peak is amplified and inverted at 69 for the production of a trigger pulse at $t_2$ which is applied to trigger multivibrator 49. The pulse from the right stage of this multivibrator is then applied by way of cathode follower 70 to "AND" gate 37 which comprises diodes 71–73. Variable resistor 74 is provided to adjust the width of $\Delta t_2$ to the desired value. Pulses from the detector 25 are applied to "AND" gate 37 by way of cathode follower 62 and conductor 75. The output of count rate meter 39 is applied to the grid of the left stage of difference amplifier 41 to obtain the relationship $$\frac{C_1}{K} - C_2$$

The output shaft of servo system 42, illustrated at 76, is coupled to arm 77 of potentiometer 65. If $$\frac{C_1}{K} - C_2$$

is zero, then the shaft of servo system 42 and hence the position of arm 77 will remain stationary. However, if, for example, $C_2$ becomes smaller than $C_1/K$, an error output will be produced from circuit 41, thereby causing shaft 76 to rotate in a direction to move arm 77 to a position to decrease the voltage between arm 77 and ground. The decrease in voltage at the grid at the left stage will decrease the width of the pulse produced by the right stage. When this occurs, pulses from detector 25 will be selected at a decreased time interval $t_2$, thereby causing $C_2$ to increase. In the cathode-coupled monostable multivibrator 47 disclosed, the width of the pulse produced by the right stage is very nearly a linear function of the voltage impressed on the grid of the left stage. The voltage from arm 77 to ground thus, for all practical purposes, is linearly related to $t_2 - t_1$. This voltage is employed to measure $\tau$ or $\lambda$. More particularly, arm 77 is coupled mechanically by member 78 to arm 79 of a second and identical potentiometer 80. Thus, the voltage between arm 79 and ground of potentiometer 80 varies as does the voltage between arm 77 and ground of potentiometer 65. The variation of the voltage at potentiometer 80 which is representative of the variation $\tau$ is applied to recorder 27 by way of conductor 81 for the production of a trace representative of the variation of $\tau$ with depth. If it is desired to record $\lambda$, the output of potentiometer 80 may be inverted at 82 before being applied to recorder 27.

In the above embodiment, the time selection of radiation was varied to change $t_2$ by varying the voltage applied to the grid of multivibrator 47 of delay circuit 33. There now will be described another system for varying $t_2$ to record $\tau$ or $\lambda$. This system also selects detecor pulses representative of secondary radiation detected within $\Delta t_1$ and $\Delta t_2$. More particularly, referring to FIGURE 4, this system comprises a time-to-pulse height converter 85, sawtooth wave and gate pulse generator 86, actuated by trigger pulses applied from amplifier 51 and two single channel pulse height analyzers 87 and 88. The time-to-pulse height converter 85 produces pulses having heights proportional to the time that radiation is detected following the start of each saw-tooth wave. These pulses are selected according to height by analyzers 87 and 88 to select radiation detected respectively within $\Delta t_1$ and $\Delta t_2$. Analyzer 88 continuously is adjusted to vary the selection of pulses produced by pulse height converter 85, thereby in effect varying the time of occurrence of $\Delta t_2$.

Figure 4:
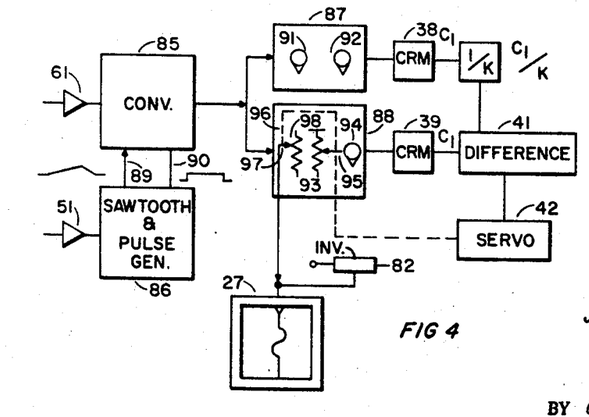
FIGURE 4 is a modification of FIGURE 1.

More particularly, in the operation of this system, a sawtooth or time varying voltage from the generator 86, which may be a type 531 Tektronix Oscilloscope, is applied to the converter 85 by way of conductor 89. This saw-tooth voltage may be generated substantially during the entire period within each pulse. In some instances it may be desirable to delay the start of the saw-tooth voltage following the start of each trigger pulse from amplifier 51. This can be done by inserting a delay circuit between amplifier 51 and saw-tooth generator 86. The amplitude of the saw-tooth voltage applied to converter 85 is sampled by sampling pulses, which are the detector pulses applied by way of amplifier 61. The time-to-pulse height converter may be of the type described in "Time-to-Pulse Height Convertor of Wide Range" by Joachim Fischer and Arne Lundby, Review of Scientfic Instruments, volume 31, number 1, January 1960. As described in the above-mentioned article, a gate is employed for accepting sampling pulses only during the rising part of the saw-tooth voltage. This gate is open only during this time by a positive pulse applied thereto by way of conductor 90. This positive pulse is available from plus (+) gate of the oscilloscope. The output of the converter 85 comprises pulses having magnitudes proportional to that of the saw-tooth voltage at the time of sampling. These output pulses thus have a magnitude proportional to time referred to the start of the saw-tooth voltage as time zero. To make the system only responsive to detector pulses which appear within the time periods $\Delta t_1$ and $\Delta t_2$, the pulse height analyzers 87 and 88 are adjusted to be responsive to pulses from converter 85 within desired pulse height ranges. This adjustment is carried out by adjusting potentiometer controls 91–94, potentiometer 93 being illustrated schematically. Controls 92 and 94 control the "window width" or width of $\Delta t_1$ or $\Delta t_2$ while controls 91 and 93 control the position of the "window" or the time position of $\Delta t_1$ or $\Delta t_2$. The outputs of analyzers 87 and 88 which are representative of the radiation detected within $\Delta t_1$ and $\Delta t_2$ are applied respectively to count rate meters 38 and 39 as described above. If $$\frac{C_1}{K} - C_2$$

is not equal to zero, servo system 42 varies the position of arm 95 of potentiometer 93 to vary the position of $\Delta t_2$, thereby increasing the decreasing $C_2$ as described previously. The variation of the voltage across arm 95 to ground thus is representative of the variation of $t_2$. Arm 95 is coupled mechanically by member 96 to arm 97 of a second and identical potentiometer 98. The voltage between arm 97 and ground is applied to recorder 27 to record the variation of $\tau$ or $\lambda$ as described above.

Figure 5:
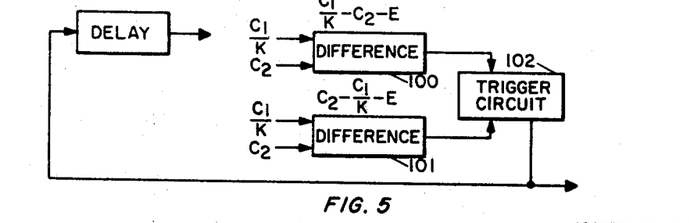
FIGURE 5 is a further modification of FIGURE 1 and is illustrated in block diagram.

In the system of FIGURE 3, a servo system was employed to move mechanically a potentiometer arm to vary the voltage at the grid of the left stage of multivibrator 47. There now will be described an electronic system for varying this voltage and thereby generating a varying voltage representative of the variation of the difference between $t_1$ and $t_2$. Referring to FIGURE 5, this system comprises difference circuits 100 and 101 coupled to circuit 102. If $C_2$ decreases to a certain value below $C_1/K$, circuit 100 produces an error output to actuate circut 102 for the production of a voltage which is applied to the grid of multivibrator 47 to decrease $t_2$, thereby causing $C_2$ to increase. On the other hand, if $C_2$ increases to a certain value above $C_1/K$, system 101 is actuated to trigger circuit 102 to apply a voltage to multivibrator 47 to increase $t_2$, thereby causing $C_2$ to decrease.

Figure 6:
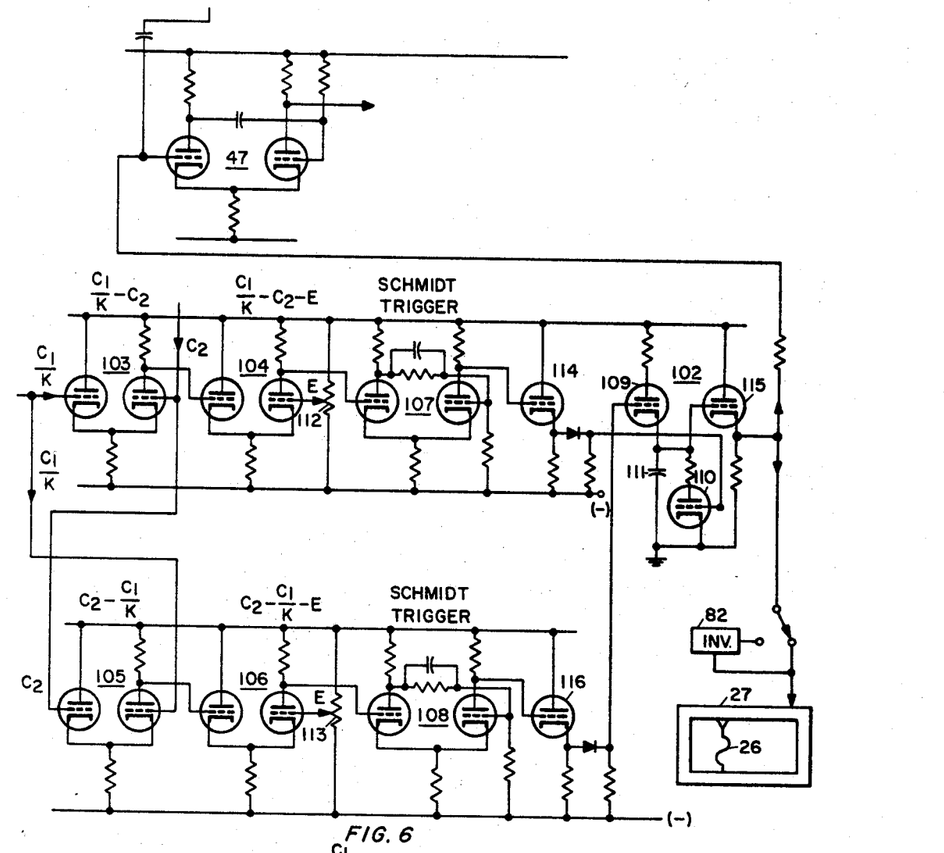
FIGURE 6 illustrates the circuitry of the system of FIGURE 5.

Refering to FIGURE 6, circuits 100 and 101 comprise respectively difference amplifier circuits 103, 104, 105, 106, and Schmidt trigger circuits 107 and 108. Circuit 102 comprises two vacuum tubes 109 and 110 having a condenser 111 coupled to the cathode of tube 109 and to the plate of tube 110. At the onset, condenser 111 is charged and tubes 109 and 110 are off. Condenser 111 discharges or charges, depending upon whether $C_2$ tends to increase or decrease. The voltage across condenser 111 is fed back to the grid of multivibrator 47 to control the selection of pulses from detector 25. If $C_2$ decreases with respect to $C_1/K$, Schmidt trigger circuit 107 is actuated to cause tube 110 to conduct, thereby allowing condenser 111 to discharge through tube 110 to ground. On the other hand, if $C_2$ increases with respect to $C_1/K$, Schmidt trigger circuit 108 is actuated to cause tube 109 to conduct, thus charging condenser 111.

More particularly, circuit 103 produces a voltage proportional to $$\frac{C_1}{K} - C_2$$

while circuit 10 produces a voltage proportional to $$C_2 - \frac{C_1}{K}$$

In addition, circuits 104 and 106 produce voltanges respectively proportional to $$\frac{C_1}{K} - C_2 - E \text{ and } C_2 - \frac{C_1}{K} - E$$

The voltages E are obtained from the potentiometers 112 and 113 and are employed to allow one to conveniently cause the Schmidt trigger circuits to trigger at any desired output of circuits 103 and 105. The purpose of the Schmidt trigger circuits is to insure that tubes 109 and 110 are either fully conducting or fully cut off. If $C_2$ decreases with respect to $C_1/K$, Schmidt trigger circuit 107 will trigger when $$\frac{C_1}{K} - C_2 - E$$

reaches some predetermined value for the production of a positive pulse at the plate of the right stage. This pulse is applied by way of cathode follower 114 to the grid of tube 110 to render the tube conducting. This causes condenser 111 to discharge through tube 110, thereby resulting in a decrease in the voltage across condenser 111. The decrease in voltage is applied by way of cathode follower 115 to the grid of the left stage of multivibrator 47. This causes $t_2$ to decrease and hence $C_2$ to increase until a value is reached wherein Schmidt trigger circuit 107 will reset and tube 110 will return to cut off. The voltage from the cathode of cathode follower 115 also is applied directly to the recorder 27 or by way of inverter 82 for the production of a continuous trace representative of the variation of $\tau$ or $\lambda$ with depth.

System 101 operates similarly to system 100 with the exception that when $C_2$ increases with respect to $C_1/K$, Schmidt trigger circuit 108 will trigger when $$C_2 - \frac{C_1}{K} - E$$

reaches some predetermined value. The output of circuit 108 is applied by way of cathode follower 116 to the grid of tube 109 to render the tube conducting. This allows condenser 111 to charge, thereby resulting in the application of an increase in voltage to the grid of multivibrator 47. This causes $t_2$ to increase, thereby resulting in a decrease of $C_2$.

Now that there has been described several embodiments for continuously and automatically measuring $\tau$ or $\lambda$ by varying $t_2$ and hence the time of occurrence of $\Delta t_2$, there will be described other components and modifications of the well logging system. More particularly, referring again to FIGURE 1, it can be seen that the logging instrument 23 is supported in the borehole 21 by a cable 120 which is wound and unwound upon a drum 121. A motor 122 drives the drum 121 by way of mechanical connection 123 to move the instrument 23 along the borehole 21. A power supply 124 is provided for supplying power to all of the components of the tool, although it is illustrated only as being coupled to source 24. The power supply 124 is supplied with energizing current by way of conductors 125 and 126 passing through cable 120.

The neutron source 24 comprises an ion source 127 of deuterium and a target 128 of tritium. Trigger pulses of positive polarity periodically are applied to the deuterium ion source 127 for ionizing the deuterium. The deuterium ions produced are accelerated to the target 128 by a high negative voltage applied thereto from the power supply 124 and conductor 129. The reaction between the deuterium ions and the tritium produces pulses or bursts of neutrons of energy of 14.3 mev. which then irradiate the adjacent formations. The detector 25 is shielded from direct radiation from source 24 by shield 130.

The pulses for ionizing the deuterium are obtained from blocking oscillator 28 and phantastron 29. More particularly, the blocking oscillator produces sharp trigger pulses which are applied by way of conductor 131 (FIGURE 3) to trigger phantastron 29 and by way of amplifiers 50 and 51 to trigger the uphole system as described previously. The phantastron produces pulses of a predetermined width which are applied by way of conductor 132 and amplifier 133 to the ion source 127. The frequency and width of the pulses applied to the ion source may be varied by varying the value of capacitors 134 and 135 respectively of oscillator 28 and phantastron 29, as understood by those skilled in the art. If thermal neutrons are being measured, the repetition rate of the neutron pulses may be of the order of 200–500 pulses per second, the width of each pulse being of the order of 50–100 microseconds. Within these limits, $\Delta t_1$ and $\Delta t_2$ may be of the order of 100 microseconds, with $t_1$ being of the order of 800 microseconds and $t_2$ being of the order of 1200 microseconds.

The outputs of the detector 25 and oscillator 28 are applied to the surface respectively by way of amplifiers 60 and 50 and conductors 136 and 137 (FIGURE 1) which pass to the surface through cable 120. At the surface, pulses are taken from conductors 136 and 137 by way of a plurality of slip rings and brushes herein illustrated at 138 and 139. At the surface, the trigger and detector pulses are applied to the measuring system respectively by way of amplifiers 51 and 61, as mentioned previously.

Figure 7:
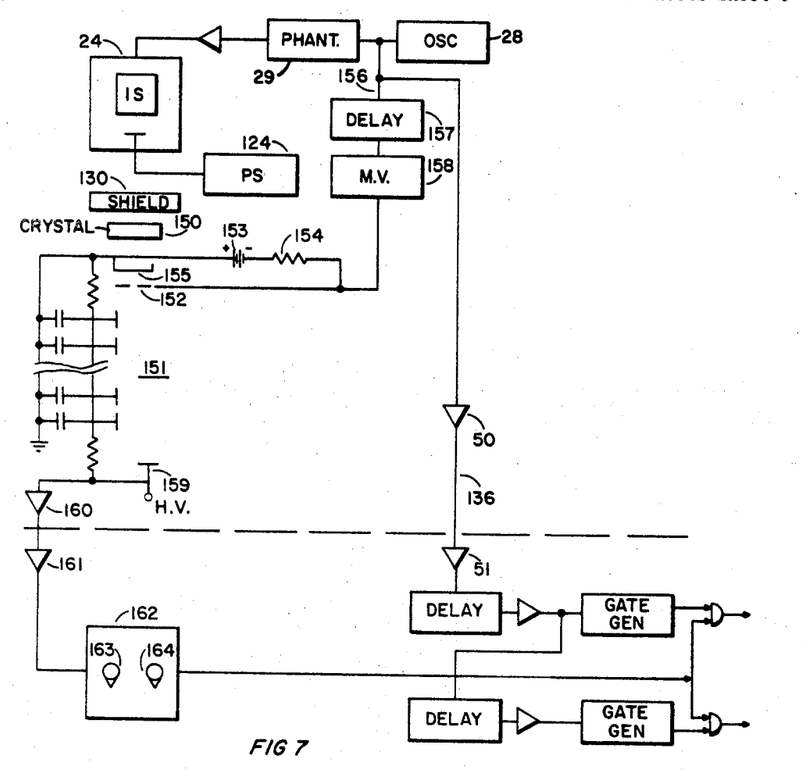
FIGURE 7 is a further modification of the system of FIGURE 1 and which may be employed to measure gamma radiation.

In the above system, there was described the measurement of the decay constant or lifetime of thermal neutrons; however, it is to be understood that such measurements can be obtained of neutron-capture gamma rays or of radioisotopes formed from the elements irradiated with primary radiation. The lifetime of neutron-capture gamma rays varies in a similar manner to that of thermal neutrons, as can be understood by those versed in the art, and thus can be employed in a similar manner to obtain information about the presence or absence of oil. On the other hand, it may be desirable to measure delayed gamma rays emitted by short-lived radioisotopes to obtain specific information about the elements present in the formations. More particularly, the detector 25 may be a gamma ray detector employed to detect delayed gamma radiation emitted by the elements when irradiated with neutrons. Referring to FIGURE 7, the gamma ray detector may comprise a scintillation crystal 150 coupled to a photomultiplier tube 151. The photomultiplier tube 151 may be normally biased to cut off during the time that the neutron generator is pulsed to prevent the high intensity radiation present during this time from affecting the gain of the tube. After the end of each pulse of neutron radiation, the tube 151 is energized to an operative condition for the production of output pulses in response to radiation detected by crystal 150. A negative potential with respect to cathode 155 normally is applied to the shield grid 152 to bias the tube to cut off. This potential is supplied by source 153 connected to resistor 154, both of which are coupled between the grid 152 and cathode 155. The trigger pulses produced by blocking oscillator 28 are utilized in the production of a positive voltage of a magnitude sufficient to overcome the bias on the tube 151. These trigger pulses are applied by way of conductor 156 to a delay circuit 157. The output of this circuit triggers a monostable multivibrator 158. When triggered, a positive pulse is produced by multivibrator 158 which is applied to shield grid 152 to overcome the bias and render the tube 151 in an operative condition for a predetermined time period between each trigger pulse. The output pulses from the plate 159 of tube 151 have heights proportional to the energy of the gamma rays detected and are applied by way of amplifiers 160 and 161 to a single channel analyzer 162 at the surface. This analyzer is adjusted by adjustment of lower threshold control 163 and window width control 164 to be responsive only to the gamma rays detected within a desired energy range. The output of analyzer 162 then is applied to the analyzing systems which may be systems 30 and 31 for the production of the desired measurements.

In one embodiment, the single channel pulse height analyzers were of the type manufactured by Tracerlab, Inc., Richmond, Calif. Model No. RLA–5S and included an RLA–3 widener and gate generator. The count rate meters were manufactured by the same company and are identified as RLR–7 research count rate meters. The servo system was of the type manufactured by Minneapolis-Honeywell Regulator Company, Brown Division, and included a 356358–103 servo amplifier and a 362480–1 servo motor. The neutron generator was of the type manufactured by N. V. Philips, Gloeilampenfabrieker, Eindhoven, Holland, Model No. 285, distributed in the United States by Norelco, 750 South Fulton Ave., Mount Vernon, N.Y. The thermal neutron detector may be one or more helium-3 proportional counters.

Now that the invention has been described, modifications will become apparent to those skilled in the art, and it is intended to cover such modifications as fall within the scope of the appended claims.

What is claimed is:

1. A radioactive well logging system for logging the formations traversed by a borehole comprising:
    a borehole unit including a neutron source for irradiating the formations with pulses of neutrons spaced in time for the production of secondary radiation,
    a detector for detecting secondary radiation passing from the formations into the borehole and for producing first functions representative of the secondary radiation detected,
    means for continuously moving said unit including said source and detector along the borehole,
    a selection circuit including:
        first and second discriminating means, a time-to-pulse height converter, the output of said detector being applied to said time-to-pulse height converter, said time-to-pulse height converter producing an output of pulses having heights proportional to the time that secondary radiation is detected, the output of said time-to-pulse height converter being applied to said discriminating means, said discriminating means being selectively responsive to predetermined magnitudes of said pulses for producing at the output thereof second and third functions representative of radiation detected within first and second time periods following each pulse of primary radiation,
        means responsive to said second and third functions for producing first and second signals representative of the intensity of secondary radiation detected within said first and second time periods,
    means for modifying one of said first and second signals by a factor equal to a ratio desired to be maintained between said first and second signals,
    means for comparing the modified signal and the other of said first and second signals,
    means responsive to the output of said comparing means for varying the response of said selection circuit for maintaining constant the ratio desired between said first and second signals, and a recorder responsive to the output of said comparing means for producing a log continuously and in correlation with depth of said borehole unit in said borehole and related to the decay of secondary radiation detected.

2. A radioactive well logging system for logging the formations traversed by a borehole comprising:

(a) a borehole unit including a neutron source for irradiating the formations with pulses of neutrons spaced in time for the production of secondary radiation, (b) a detector for detecting secondary radiation passing from the formations into the borehole and for producing first functions representative of the secondary radiation detected, (c) means for continuously moving said unit including said source and detector along the borehole, (d) a selection circuit including:
first and second gate generators,
first and second gating circuits, the output of said detector being applied to said first and second gating circuits,
means for actuating said first gate generator, the output of said first gate generator being applied to said first gating circuit to produce at the output thereof a second function representative of detected secondary radiation within a first time period following each pulse of neutrons,
means for actuating said second gate generator, the output of said second gate generator being applied to said second gating circuit to produce at the output thereof a third function representative of detected secondary radiation within a second time period following each pulse of neutrons,
means responsive to said second and third functions for producing first and second signals representative of the intensity of secondary radiation detected within said first and second time periods, (e) means for modifying one of said first and second signals by a factor equal to a ratio desired to be maintained between the said first and second signals, (f) means for comparing the modified signal and the other of said first and second signals, (g) means responsive to the output of said comparing means for varying the response of said selection circuit for maintaining constant the ratio desired between said first and second signals, and (h) a recorder responsive to the output of said comparing means for producing a log continuously and in correlation with depth of said borehole unit in said borehole and related to the decay of secondary radiation detected.

3. The system of claim 2 wherein said modifying means includes a multiplier producing a function representative of the product of the first signal and the reciprocal of the ratio desired to be maintained between the first and second signals.

4. The system of claim 2 wherein said detector is a neutron detector for detecting thermal neutrons passing from the formations into a borehole, the recorder produces a log indicative of said decay of thermal neutrons detected.

5. The system of claim 2 wherein:
said modifying means includes multiplying means for modifying said first signal by a factor equal to a ratio desired to be maintained between said first and second signals,
said comparing means including a difference circuit for producing an output representing the difference between the modified signal and said second signal,
said means responsive to the output of said comparing means includes a servo system responsive to the difference between the modified signal and said second signal,
said servo system controlling said first and second gating circuits to vary the time spacing between said first and second time periods to maintain said ratio constant, and
said recorder being controlled by said servo system for continuously recording the variation with time of the intensity of detected secondary radiation in correlation with depth of said borehole unit in said borehole.

6. The system recited in claim 5 wherein:
said first gating circuit is opened a predetermined time after the irradiation of the formations with each pulse of neutrons to pass to the output thereof said first functions occurring within said first time period,
said second gating circuit is opened a variable time after the irradiation of the formations with each pulse of neutrons to pass to the output thereof said first functions occurring within said second time period,
and wherein said servo system controls said variable time of opening of said second gating circuit.

7. The system recited in claim 6 further including:
a first delay circuit, means for applying a pulse to the input of said first delay circuit at a time representing the irradiation of said formations with each pulse of neutrons,
said first delay circuit producing at the output thereof a pulse at said predetermined time, the output of said first delay circuit being connected to open said first gating circuit at said predetermined time,
a second delay circuit having a variable delay, the output of said first delay circuit being applied to the input to said second delay circuit, the output of said second delay circuit being connected to open said second gating circuit at said variable time, said servo system being connected to control said variable delay.

8. The system recited in claim 2 wherein said detector is a gamma ray detector for detecting gamma radiations passing from the formations into the borehole and for producing first functions representative of the gamma radiation detected.

References Cited

UNITED STATES PATENTS

| 2,963,587 | 12/1960 | Rickard | 250—83.6 |
| 2,974,231 | 3/1961 | Greenblatt et al. | 250—83.3 |
| 3,102,956 | 9/1963 | Armistead | 250—71.5 X |
| 3,133,195 | 5/1964 | Jones et al. | 250—83.1 |
| 3,164,720 | 1/1965 | Armistead | 250—83.3 |

OTHER REFERENCES

A. H. Youmans et al., Neutron Lifetime, A New Log, published by Lane Wells, October 9, 1963, pages 3–13.

RALPH G. NILSON, *Primary Examiner.*

S. ELBAUM, *Assistant Examiner.*

UNITED STATES PATENT OFFICE
CERTIFICATE OF CORRECTION

Patent No. 3,402,294                          September 17, 1968

James D. Bargainer, Jr.

It is certified that error appears in the above identified patent and that said Letters Patent are hereby corrected as shown below:

Column 1, line 13, "any" should read -- and --. Column 2, line 31, "represets" should read -- represents --. Column 3, line 13, "or" should read -- of --. Column 4, line 52, after "equal" insert -- to --; line 67, "portionally" should read -- portionality --. Column 7, line 41, "the" should read -- or --; line 58, "circut" should read -- circuit --. Column 8, line 10, "circuit 10" should read -- circuit 105 --; line 15, "voltanges" should read -- voltages --. Column 11, line 46, after "between" cancel "the"; line 65, before "recorder" "the" should read -- said --; line 66, before "decay" "said" should read -- the --. Column 12, line 32, after "circuit," a new paragraph should begin with "means for applying".

Signed and sealed this 10th day of February 1970.

(SEAL)
Attest:

EDWARD M. FLETCHER, JR.                    WILLIAM E. SCHUYLER, JR.
Attesting Officer                             Commissioner of Patents